Patented Sept. 9, 1941

2,255,371

UNITED STATES PATENT OFFICE 2,255,371

TREATMENT OF CLAY

Ira Williams, Borger, Tex., and Nathan Millman, Macon, Ga., assignors to Sgoda Corporation, Huber, Ga., a corporation of New Jersey No Drawing. Application April 16, 1940, Serial No. 329,889

13 Claims. (Cl. 23—1)

This invention relates to the purification of clay and more particularly to the treatment of acidic clay slips.

Natural clays vary considerably in properties, even when produced from mines in the same locality. They vary from almost white to quite highly colored maerials. Much of the color of the clay is generally due to the presence of iron and its compounds. The presence of iron is objectionable in clay to be used in many commercial processes mainly because of its color and partially due to its effect on other properties of the clay. Accordingly, it is usually desired to remove the iron from the clay and to improve the color of the clay. The clay frequently contains mica and other course materials which are undesirable and hence are generally removed.

In the treatment of clays, it is common practice to first blunge the clay to prepare a slip or slurry of the clay in water. The slip may contain any desired quantity of clay to form a slurry of the required consistency, which may vary from thin to a mud too thick to pour. The concentrations usually required vary from about 10 to about 50 pounds of clay in 100 pounds of water. It is also common practice to add, to the clay slip, a peptizing agent, such as sodium carbonate, sodium pyrophosphate, sodium silicate or sodium metaphosphate, which decreases the viscosity of the slip. The peptizing agent converts the slip to a watery consistency immediately, whereupon the mica and other course materials settle out in a few minutes as a heavy layer in the bottom of the vessel containing the slip and can be readily separated from the slip.

It is also common practice to reduce the color of clay by a bleaching process which usually comprises treating the clay slip with a strong acid in the presence of an agent which will reduce the iron from the ferric to the ferrous state. The addition, of such bleaching materials or other electrolytes or coagulants, renders the slip viscous again. After being bleached, the clay slip is usually strongly acid, having pH values between about 1.5 and about 4.5, and contains the iron, which was responsible for much of the color, in solution as a ferrous salt.

The recovery of the clay from such strongly acid slips has presented problems which have been extremely difficult to solve. It has been proposed to separate the clay from the slip by filtration, centrifuging or other methods without neutralization of the acid in the slip. When such methods are used, the acid attacks the metal and cloth of the equipment, rapidly destroying such equipment. Furthermore, the clay, as separated by such method, is deficient in desirable properties required for some commercial purposes such as paper coating.

It has also been proposed to neutralize or reduce the acidity of the slip by adding caustic or soluble basic salts of the alkali metals and alkaline earth metals. The addition of such soluble alkaline materials, in amounts sufficient to substantially increase the pH value of the slip and particularly in amounts sufficient to produce a pH value of 4.5 or above, causes a separation of much of the iron, usually as ferrous hydroxide, which will be retained by the clay during filtration and washing and which eventually produces objectionable color in the clay. Further, by the use of such basic alkaline materials, the slip may be readily converted to a neutral or alkaline condition, that is, the pH may be increased to 7 or above which again affects the properties of the clay. Furthermore, if the slip should inadvertently be rendered strongly alkaline, it will attack the equipment to an objectionable extent.

It is an object of the present invention to provide a method for the treatment of highly acid clay slips which will protect the equipment, eliminate excessive washing and preserve the color and other desirable properties of the clay. Another object is to provide a method of partially neutralizing a highly acid clay slip to produce a clay with desirable properties for paper coating. Still another object is to provide a safe and effective method of partially neutralizing a highly acid clay slip without increasing the pH to 7 and without precipitating iron in solution in the slip. A further object is to provide a method of treating a clay slip having a pH below 5 and containing iron in solution, to increase the pH of the slip to between 5 and 7 without precipitation of the iron in solution in the slip. Other objects are to advance the art. Still other objects will appear hereinafter.

The above and other objects of our invention may be accomplished by treating a clay slip, having a pH below 5, due primarily to an acid stronger than carbonic acid, with a carbonate of an alkaline earth metal in an amount sufficient to materially increase the pH of the slip, but insufficient to raise the pH of the slip to 7. When such carbonates are used to neutralize the acid in the slip, even if a substantial excess over a chemical equivalent of the acid in the slip is added, the slip is not rendered alkaline or neutral. Accordingly, the alkaline earth metal carbonates do not require the skill and careful control required of the stronger water soluble bases heretofore employed. We have found that, when such alkaline earth metal carbonates are employed for raising the pH of the slip above 4.5, any iron in solution tends to remain in solution and is readily separated from the slip by filtration or centrifuging and washing. Furthermore, the clay, after being separated from the liquid in the slip, has improved properties particularly desirable for coating paper.

The slips, to be treated in accordance with our invention, may be prepared by any of the usual methods, particularly those hereinbefore described. The slips will usually contain from about 10 to about 50 pounds of clay in 100 pounds of water. The slips may have been treated with peptizing agents, such as those hereinbefore mentioned, and separated from mica and other course materials. The slips preferably will be bleached by any of the common methods, such as by the use of sodium hydrosulfite or zinc and sulfur dioxide, particularly in the presence of acids stronger than carbonic acid. The bleached clay slips will usually have a pH value between about 1.5 and about 4.5 and will generally contain iron in solution.

The alkaline earth metal carbonates may be added to the slips in any suitable manner and are preferably added with agitation. They are to be added in amounts sufficient to materially increase the pH of the slips, that is, to increase the pH of the slips by at least 0.5. They will generally be added in amounts sufficient to increase the pH of the slips to about 5 and preferably, in amounts sufficient to increase the pH of the slips to at least 5.5. The most desirable results will be obtained when the alkaline earth metal carbonates are employed in amounts sufficient to increase the pH of the slips to about 6 in order to produce clays having particularly desirable properties for use in the treatment of paper.

The carbonates of all the alkaline earth metals have been found to be suitable for our purpose, even though they are substantially insoluble in the slips. Calcium carbonate appears to be the most effective with the greatest variety of acids, is the cheapest and is, therefore, preferred. However, barium carbonate appears to be the most effective, when used with sulfuric acid, and produces compounds having desirable properties for some purposes which desirable properties are thus imparted to the clays treated with it.

While the alkaline earth metal carbonates may be the sole agents employed for reducing the acidity of the clay slips, where desired, the acidity of the slips may be initially partially reduced by alkaline materials such as have been employed heretobefore. Illustrative of such alkaline materials are soda ash, caustic soda, sodium phosphate, sodium silicate, potash, lime, ammonia and the like. However, such initial partial neutralization by such alkaline materials should not be carried out to increase the pH above 4.5 to 5 or iron, precipitated during the addition, will fail to re-dissolve. During the addition of such alkaline materials, there will be a tendency for the precipitation of iron which, however, will re-dissolve if the pH is not increased to above 4.5. After such initial partial neutralization, further neutralization may be accomplished by the addition of an alkaline earth metal carbonate without precipitation of iron from the solution. The clay may be recovered by filtration or centrifuging, after such further neutralization, and, as so recovered, will retain its desirable bleached color.

In order to illustrate our invention more clearly, the preferred modes of carrying the same into effect and the advantageous results to be obtained thereby, the following examples are given:

Example I 200 grams of Georgia clay was slurried in 467 cubic centimeters of water containing 0.6 gram of sodium meta silicate. About 5% of mica and grit was permitted to settle and the upper layer, containing the suspended clay, was decanted. The upper layer was then bleached by the addition of 0.55 gram of sodium bisulfite, 0.3 gram of powdered zinc and 1.27 grams of sulfuric acid, sp. gr. 1.84. The resulting slip had a pH of 1.92.

The slip was divided into two equal portions and one portion was treated with 0.38 gram of finely divided calcium carbonate. After 30 minutes, the pH was reduced to 4.0. Both portions of the clay were then filtered off and dried at 100° C. The color of the treated portion was found to be equal to that of the untreated portion.

Example II 200 grams of a Carolina clay, slurried in 467 cubic centimeters of water, was peptized with 0.3 gram of sodium hexametaphosphate. About 5% of mica and grit were permitted to settle and the upper layer, containing the suspended clay, was decanted. The slip was then bleached with 0.5 gram of sodium hydrosulfite and 1.0 gram of sulfuric acid. The pH of the bleached slip was 1.75. 1.53 grams of finely powdered strontium carbonate was then added and well stirred through the slip. In 30 minutes, the pH of the slip was 5.95. The addition of 1 gram more of the strontium carbonate reduced the pH to 6.05. The clay was then filtered off under suction and the filtrate gave a test for ferrous iron. The clay was dried at 90° C. The dried clay was considerably whiter than the original untreated clay.

Example III

A Georgia clay was suspended in water to form a slip containing 30% clay. The slip was bleached with sodium hydrosulfite and acetic acid which were added at a rate of 4 pounds and 10 pounds, respectively, per ton of clay. The pH of the slip was 3.25. After bleaching, the slip was treated with finely divided barium carbonate at the rate of 34 pounds per ton of clay. The pH of the slip increased to 5.95. The slip was then filtered. The filtrate contained iron in solution. The clay was dried and found to be less colored than the untreated clay.

Example IV 200 grams of a Wyoming clay was slurried to form a slip which was bleached with 0.4 gram of zinc hydrosulfite and 1.0 gram of sulfuric acid. The bleached slip had a pH of 1.90. The addition of 1.1 grams of powdered calcium carbonate increased the pH to 5.5. The slip was filtered and the filtrate was found to contain iron in solution. The dried filter cake was improved in color when compared to the unbleached clay.

Example V

A Georgia clay slip, peptized with sodium silicate and bleached with sodium hydrosulfite and sulfuric acid, had a pH of 1.85. The acidity was reduced to a value of 4.53 by the addition of sodium pyrophosphate. Barium carbonate, equivalent to the acid employed, was then stirred in. After 2 hours, the pH had been increased to 6.05.

It will be apparent that the above examples are given for illustrative purposes only and that many variations may be made in the process without departing from our invention. The invention may be used in batch or continuous processes. Mixtures of two or more alkaline earth metal carbonates may be employed, if desired. The alkaline earth metal carbonate may be introduced at any convenient point in the process of treating the clay. The acid, employed in the bleaching step, and the alkaline earth metal carbonate may be selected to produce a desirable compound of the alkaline earth metal, such as barium sulfate, in which case the amounts of acid and of alkaline earth metal carbonate may be increased as desired. In case the acidity of the slip is to be partially reduced by a soluble strongly alkaline material, such alkaline material may be added prior to the addition of the alkaline earth metal carbonate or may be added along with the alkaline earth metal carbonate to thereby obtain a more rapid reduction in the acidity of the slip. When desired, the clay may be treated with acid alone, that is, without a bleaching agent in order to remove acid soluble impurities and the acidity may then be decreased by means of the alkaline earth metal carbonate, either alone or in combination with other suitable material. The acidity or pH of the clay may be due to any acid stronger than carbonic acid, such as sulfuric, acetic, oxalic, formic, hydrochloric or the like, but it will usually be due to sulfuric acid.

The term "clay" as employed herein will be understood to be used generically to include argillaceous materials of the clay type, such as kaolin, barytes, feldspar, bauxite and the like. By "an acid stronger than carbonic acid," we mean an acid which will replace carbonic acid from its salts.

It will be apparent from the above disclosure that the clay slips are not brought to a completely neutral condition by the alkaline earth metal carbonates, even though an excess, of the alkaline earth metal carbonate over a chemical equivalent of the acid present in the slip, was employed. Thus, the alkaline earth metal carbonates are safer to employ than the strongly alkaline bases, as there is little danger of rendering the slip neutral or alkaline in reaction. The choice of acid and alkaline earth metal carbonate will to a considerable extent determine the final pH of the slip. However, the slip has been converted into a condition which can be readily handled without excessive attack on metal and cloth equipment, and this has been accomplished without precipitation of dissolved iron from the slip.

We claim:

1. The process which comprises the step of treating a clay slip, having a pH below 5 due to an acid stronger than carbonic acid, with a carbonate of an alkaline earth metal in an amount sufficient to materially increase the pH of the slip but insufficient to raise the pH of the slip to 7.

2. The process which comprises the step of treating a clay slip, containing iron in solution and having a pH below 5 due to an acid stronger than carbonic acid, with a carbonate of an alkaline earth metal in an amount sufficient to increase the pH of the slip above 5 but insufficient to raise the pH of the slip to 7.

3. The process which comprises the step of treating a clay slip, containing iron in solution and having a pH below 5 due to an acid stronger than carbonic acid, with a carbonate of an alkaline earth metal in an amount sufficient to increase the pH of the slip to about 6 but insufficient to raise the pH of the slip to 7.

4. The process which comprises the step of treating a clay slip, having a pH below 5 due to an acid stronger than carbonic acid, with calcium carbonate in an amount sufficient to materially increase the pH of the slip but insufficient to raise the pH of the slip to 7.

5. The process which comprises the step of treating a clay slip, containing iron in solution and having a pH below 5 due to an acid stronger than carbonic acid, with calcium carbonate in an amount sufficient to increase the pH of the slip above 5 but insufficient to raise the pH of the slip to 7.

6. The process which comprises the step of treating a clay slip, having a pH below 5 due to an acid stronger than carbonic acid, with barium carbonate in an amount sufficient to materially increase the pH of the slip but insufficient to raise the pH of the slip to 7.

7. The process which comprises the step of treating a clay slip, containing iron in solution and having a pH below 5 due to an acid stronger than carbonic acid, with barium carbonate in an amount sufficient to increase the pH of the slip above 5 but insufficient to raise the pH of the slip to 7.

8. The process which comprises the step of treating a clay slip, containing iron in solution and having a pH below 5 due to sulfuric acid, with a carbonate of an alkaline earth metal in an amount sufficient to increase the pH of the slip above 5 but insufficient to raise the pH of the slip to 7.

9. The process which comprises the step of treating a clay slip, containing iron in solution and having a pH below 5 due to sulfuric acid, with calcium carbonate in an amount sufficient to increase the pH of the slip above 5 but insufficient to raise the pH of the slip to 7.

10. The process which comprises the step of treating a clay slip, containing iron in solution and having a pH below 5 due to sulfuric acid, with barium carbonate in an amount sufficient to materially increase the pH of the slip but insufficient to raise the pH of the slip to 7.

11. The process which comprises the step of treating a clay slip, containing iron in solution and having a pH below 5 due to sulfuric acid, with barium carbonate in an amount sufficient to increase the pH of the slip above 5 but insufficient to raise the pH of the slip to 7.

12. The process which comprises treating a clay slip, having a pH below 4.5 due to an acid stronger than carbonic acid, with a strong water-soluble base in an amount sufficient to materially increase the pH of the slip but insufficient to raise the pH of the slip above 5 and then with a carbonate of an alkaline earth metal in an amount sufficient to increase the pH of the slip above 5 but insufficient to raise the pH of the slip to 7.

13. The process which comprises treating a clay slip, containing iron in solution and having a pH below 4.5 due to an acid stronger than carbonic acid, with a strong water-soluble basic compound of an alkali metal in an amount sufficient to materially increase the pH of the slip but insufficient to raise the pH of the slip above 5 and then with a carbonate of an alkaline earth metal in an amount sufficient to increase the pH of the slip to at least 5.5 but insufficient to raise the pH of the slip to 7.

IRA WILLIAMS.
NATHAN MILLMAN.